US011606277B2

(12) United States Patent
Chakankar et al.

(10) Patent No.: US 11,606,277 B2
(45) Date of Patent: Mar. 14, 2023

(54) REDUCING THE IMPACT OF NETWORK LATENCY DURING A RESTORE OPERATION

(71) Applicant: Cohesity, Inc., San Jose, CA (US)

(72) Inventors: Abhijit Chakankar, San Jose, CA (US); Prashant Gothi, San Jose, CA (US); Anubhav Gupta, Sunnyvale, CA (US); Manoj Singhal, Sunnyvale, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 17/173,009

(22) Filed: Feb. 10, 2021

(65) Prior Publication Data

US 2022/0255826 A1 Aug. 11, 2022

(51) Int. Cl.
*H04L 67/1097* (2022.01)
*H04L 43/0864* (2022.01)

(52) U.S. Cl.
CPC ...... *H04L 43/0864* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 8,315,986 B1* | 11/2012 | Kapoor | ............... | G06F 11/1464 707/679 |
| 9,781,224 B2* | 10/2017 | Lee | .................. | H04L 45/02 |
| 10,366,072 B2* | 7/2019 | Lad | .................. | E21D 21/008 |
| 2002/0035630 A1* | 3/2002 | Stumer | ............. | H04Q 11/0457 709/227 |
| 2007/0124415 A1* | 5/2007 | Lev-Ran | ................. | H04L 67/06 709/217 |
| 2008/0025298 A1* | 1/2008 | Lev-Ran | ................. | H04L 69/04 370/477 |
| 2010/0082836 A1* | 4/2010 | Zhang | ................ | H04L 12/6418 709/232 |
| 2011/0016095 A1 | 1/2011 | Anglin | | |
| 2011/0218969 A1 | 9/2011 | Anglin | | |
| 2011/0225385 A1* | 9/2011 | Tofano | ............... | G06F 16/1748 711/170 |
| 2012/0317359 A1 | 12/2012 | Lillibridge | | |
| 2013/0101113 A1* | 4/2013 | Cannon | ..................... | H04L 9/14 380/44 |
| 2013/0346374 A1* | 12/2013 | Wolf | ................... | G06F 16/1752 707/685 |
| 2014/0133308 A1* | 5/2014 | Williams | ................ | H04L 47/11 370/235 |
| 2014/0207868 A1* | 7/2014 | Gordon | .............. | G06F 11/1464 709/204 |

(Continued)

*Primary Examiner* — Joshua Joo
(74) *Attorney, Agent, or Firm* — Van Pelt, Yi & James LLP

(57) ABSTRACT

Data chunks sent to a content destination are tracked. It is determined whether content of a portion of an object to be sent to the content destination matches one of the data chunks previously sent to the content destination. In response to the determination that the portion of the object to be sent to the content destination matches one of the data chunks previously sent to the content destination, a source reference to the matching previously sent data chunk where the content destination can locally obtain the content for the portion of the object is provided to the content destination.

17 Claims, 4 Drawing Sheets

(56) References Cited

U.S. PATENT DOCUMENTS

| | | | |
|---|---|---|---|
| 2014/0330795 A1* | 11/2014 | Chavda | G06F 11/1469 |
| | | | 707/692 |
| 2016/0119243 A1* | 4/2016 | Song | H04L 47/365 |
| | | | 709/217 |
| 2016/0301621 A1* | 10/2016 | Sazawa | H04L 1/1816 |
| 2016/0309219 A1* | 10/2016 | Zhang | H04N 21/43615 |
| 2017/0078437 A1* | 3/2017 | Rhea | H04L 12/2854 |
| 2017/0097875 A1* | 4/2017 | Jess | G06F 11/1092 |
| 2017/0289238 A1* | 10/2017 | Corrao | G06F 3/06 |
| 2017/0346887 A1* | 11/2017 | Kaguma | H04L 67/1093 |
| 2018/0181690 A1* | 6/2018 | Song | G06F 30/20 |
| 2019/0034507 A1* | 1/2019 | Duttagupta | G06F 16/1752 |
| 2021/0326222 A1* | 10/2021 | Borowiec | G06F 3/067 |

* cited by examiner

REDUCING THE IMPACT OF NETWORK LATENCY DURING A RESTORE OPERATION

BACKGROUND OF THE INVENTION

A storage system may be connected to a content destination over a wide area network. The storage system is configured to restore one or more files to the content destination over the wide area network. When restoring a large number of files (e.g., greater than a threshold number) or a large file (e.g., greater than a threshold file size, such as 1 TB), a latency associated with the wide area network may prevent a restore service level agreement from being met.

BRIEF DESCRIPTION OF THE DRAWINGS

Various embodiments of the invention are disclosed in the following detailed description and the accompanying drawings.

DETAILED DESCRIPTION

Figure 1:
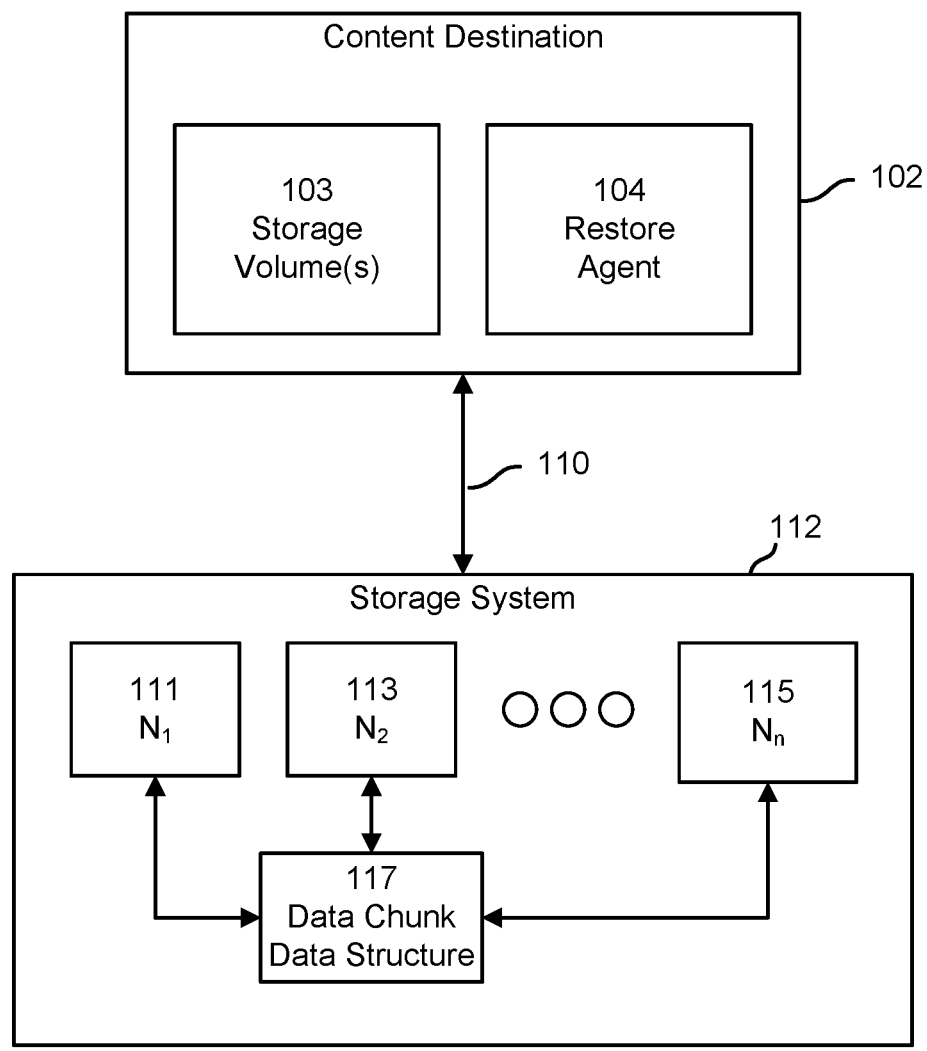
FIG. 1 is a block diagram illustrating an embodiment of a system for reducing the impact of network latency during a restore operation.

A technique to reduce the impact of network latency during a restore operation is disclosed herein. A storage system may receive a request to restore one or more objects. An object may correspond to a file, a database, a virtual machine, an application, a volume, etc. When performing a restore operation, other systems may send all of the data chunks associated with one or more requested objects over a wide area network to a content destination. However, a restore service level agreement may be missed depending on the amount of data that is sent due to the network latency. A content destination may be a datacenter, a server, a computer, a cloud computing device, etc.

Other systems may install a restore agent at the content destination and configure the restore agent to maintain a data structure that identifies data chunks stored at the content destination. A storage system may compute corresponding chunk identifiers for data chunks included in a batch of data chunks to be sent to the content destination and send the corresponding chunk identifiers to the restore agent. In response, the restore agent may utilize the data structure to identify one or more data chunks that are stored and/or not stored at the content destination and request for the one or more data chunks that are not stored at the content destination. In response, the storage system may send the one or more requested data chunks. However, such a configuration uses computing resources of the content destination to perform the comparison operation. This may reduce the overall performance of the content destination because the content destination may be performing one or more other tasks while the restore operation is being performed. Thus, resources that could be used to perform the one or more tasks are being diverted to perform the comparison operation. The configuration also uses storage resources of the content destination to maintain the data structure. A size of the data structure may become quite large. This configuration reduces the available storage at the content destination because the content destination is using storage to store the data structure that could be used to store other data.

Using the disclosed technique, the storage system may reduce the impact of network latency on the restore operation and reduce the amount of content destination resources (e.g., computing, storage) needed to perform a restore operation by calculating a corresponding chunk identifier (e.g., SHA-1 hash value) for data chunks included in a first batch of data chunks to be sent to a content destination and sending the first batch of data chunks to the content destination. After receiving the first batch, the content destination sends an acknowledgement signal indicating the first batch of data chunks was received. In response to receiving the acknowledgement signal, the storage system tracks the corresponding chunk identifiers included in the first batch in a data structure. In some embodiments, the first batch of data chunks corresponds to a first portion of a plurality of portions of an object. In some embodiments, the first batch of data chunks corresponds to an entire portion of an object. In some embodiments, the first batch of data chunks corresponds to a plurality of objects. The content destination includes a restore agent that receives the first batch of data chunks and stores the first batch of data chunks at the content destination.

The storage system is configured to send a subsequent batch of data chunks to the content destination. A subsequent batch of data chunks may refer to a subsequent portion of an object, a portion of a different object, or different objects. Prior to sending a subsequent batch of data chunks, the storage system is configured to determine whether any of the data chunks included in the subsequent batch have been previously sent to the content destination by computing corresponding chunk identifiers for data chunks included in the subsequent batch and comparing the computed chunk identifiers with the chunk identifiers stored in the data structure.

In the event a computed chunk identifier matches a chunk identifier stored in the data structure, the storage system provides to the content destination a source reference that indicates an object to which the previously sent data chunk was written and a target reference that indicates an object to which the previously sent data chunk is to be written. The source reference may include one or more of an object name, an object offset, a read size, a source storage location, a chunk identifier, or an object path (e.g., file path.). The object to which the previously sent data chunk is to be written may be the same object associated with the previously sent data chunk (i.e., the object that is currently being restored) or a different object that was previously restored.

In response to receiving the source reference, the restore agent locally obtains the previously sent data chunk based on the source reference and writes the previously sent data chunk at a target reference associated with the content destination (e.g., a storage location for the object being restored). In some embodiments, the restore agent performs deduplication and writes at the storage location associated with the content destination a reference to the previously sent data chunk stored at the content destination instead of storing multiple copies of the previously sent data chunk.

In the event a computed chunk identifier does not match a chunk identifier stored in the data structure, the storage system provides to the content destination the data chunk associated with the non-matching chunk identifier. In response to receiving the data chunk associated with the non-matching chunk identifier, the restore agent stores the data chunk associated with the non-matching chunk identifier at a storage location associated with the content destination.

The storage system is configured to perform this process for one or more subsequent batches of data chunks until the one or more requested objects are restored to the content destination. As a result, the impact of network latency on the restore operation has been reduced because the amount of data that has been provided from the storage system to the content destination has been reduced.

FIG. 1 is a block diagram illustrating an embodiment of a system 100 for reducing the impact of network latency during a restore operation. In the example shown, content destination 102 is coupled to storage system 112 via network connection 110. Network connection 110 may be a LAN, WAN, intranet, the Internet, and/or a combination thereof.

Storage system 112 includes nodes 111, 113, 115. Although three nodes are shown, storage system 112 may be comprised of n nodes. Content destination 102 may be a datacenter, a server, a computer, a cloud computing device, etc. Content destination 102 is capable of communicating with a single node, some of the nodes, or all of the nodes 111, 113, 115 via network connection 110. Content destination 102 is capable of communicating with some or all of the nodes, in parallel, via network connection 110.

In some embodiments, a node of storage system 112 includes a processor, memory, and a plurality of storage devices. The plurality of storage devices may include one or more solid state drives, one or more hard disk drives, or a combination thereof.

In some embodiments, a node of storage system 112 includes a processor and memory, and is coupled to a separate storage device. The separate storage device may include one or more storage devices (e.g., flash storage devices). A storage device may be segmented into a plurality of partitions. Each of the nodes 111, 113, 115 may be allocated one or more of the partitions. The one or more partitions allocated to a node may be configured to store data associated with some or all of the plurality of objects that were backed up to storage system 112. For example, the separate storage device may be segmented into 10 partitions and storage system 112 may include 10 nodes. A node of the 10 nodes may be allocated one of the 10 partitions.

In some embodiments, a node of storage system 112 includes a processor, memory, and a storage device. The node may be coupled to a separate storage device. The separate storage device may include one or more storage devices. A storage device may be segmented into a plurality of partitions. Each of the nodes 111, 113, 115 may be allocated one or more of the partitions. The one or more partitions allocated to a node may be configured to store data associated with some or all of the plurality of objects that were backed up to storage system 112. For example, the separate storage device may be segmented into 10 partitions and storage system 112 may include 10 nodes. A node of the 10 nodes may be allocated one of the 10 partitions.

In some embodiments, the nodes are homogenous nodes where each node has the same capabilities (e.g., processing, storage, memory, etc.). In some embodiments, at least one of the nodes is a heterogeneous node with different capabilities (e.g., processing, storage, memory, etc.) than the other nodes of storage system 112.

Storage system 112 may be a cloud instantiation of a backup system. A configuration of a cloud instantiation of storage system 112 may be a virtual replica of a backup system. For example, a backup system may be comprised of three storage nodes, each storage node with a storage capacity of 10 TB. A cloud instantiation of the backup system may be comprised of three virtual nodes, each virtual node with a storage capacity of 10 TB. In other embodiments, a cloud instantiation of a backup system may have more storage capacity than an on-premises instantiation of a backup system. In other embodiments, a cloud instantiation of a backup system may have less storage capacity than an on-premises instantiation of a backup system.

Storage system 112 is configured to store data chunks associated with one or more objects. Storage system 112 is configured to receive from content destination 102 a request to restore at least one of one or more objects. In some embodiments, the request is for a large number of objects (e.g., greater than a threshold number). In some embodiments, the request is for a large object (e.g., greater than a threshold object size).

In response to the request, storage system 112 is configured to calculate a corresponding chunk identifier (e.g., SHA-1 hash value) for data chunks included in a first batch of data chunks associated with the request and send the first batch of data chunks to content destination 102. After receiving the first batch, restore agent 104 sends an acknowledgement signal indicating the first batch of data chunks was received. In response to receiving the acknowledgement signal, storage system 112 tracks the corresponding chunk identifiers included in the first batch in data chunk data structure 117. Data chunk data structure 117 may be a table, a list, an array, a graph, a key-value store, etc. In some embodiments, data chunk data structure 117 is a distributed data structure that is available to all of the nodes 111, 113, 115. When one of the nodes updates data chunk data structure 117, the update is seen by the other nodes. In some embodiments, data chunk data structure 117 is a centrally managed data structure. In some embodiments, the first batch of data chunks corresponds to a first portion of a plurality of portions of an object. In some embodiments, the first batch of data chunks corresponds to an entire portion of an object. In some embodiments, the first batch of data chunks corresponds to a plurality of objects. Content destination 102 includes restore agent 104. In response to receiving the first batch of data chunks, restore agent 104 is configured to store the first batch of data chunks in one of the one or more storage volumes 103.

In some embodiments, content destination 102 does not include restore agent 104. In such a scenario, the location of where objects are stored at content destination 102 is accessible to storage system 112. Storage system 112 may use a communication protocol, such as server message block (SMB) or common internet file system (CIFS), to communicate the data chunks. Storage system 112 may directly write a batch of data chunks to a storage location at content destination 102 for an object. In some embodiments, content destination 102 includes a function that enables storage system 112 to send to content destination 102 a command that causes content destination 102 to copy data from a first location at content destination 102 to a second location at 102.

In some embodiments, data chunk data structure 117 is configured to store a particular amount of chunk identifiers (e.g., 50 MB). A user associated with storage system 112 may configure data chunk data structure 117 to store the particular amount of chunk identifiers. In the event data chunk data structure 117 stores the particular amount of chunk identifiers, then one or more stored chunk identifiers may be removed from data chunk data structure 117 when data chunk data structure 117 is updated to include one or more new chunk identifiers. The one or more stored chunk identifiers may be removed based on an age associated with a chunk identifier, a popularity associated with the chunk identifier (e.g., how many times a data chunk corresponding to the chunk identifier has not been sent to content destination 102), etc.

Prior to sending a subsequent batch of data chunks (i.e., content of a portion of an object), storage system 112 is configured to determine whether any of the data chunks included in the subsequent batch have been previously sent to content destination 102 by computing corresponding chunk identifiers for data chunks included in the subsequent batch and comparing the computed chunk identifiers with the chunk identifiers stored in data chunk data structure 117. A subsequent batch of data chunks may refer to a subsequent portion of the object, a portion of a different object, or different objects. In the event a computed chunk identifier matches a chunk identifier stored in data chunk data structure 117, storage system 112 is configured to provide to content destination 102 a source reference that indicates an object to which the previously sent data chunk was written and a target reference that indicates an object to which the previously sent data chunk is to be written. The source reference may include one or more of an object name, an object offset, a read size, a source storage location, a chunk identifier, or an object path (e.g., file path). The object to which the previously sent data chunk is to be written may be the same object associated with the previously sent data chunk (i.e., the object that is currently being restored) or a different object that was previously restored.

In response to receiving the source and target references, restore agent 104 locally obtains the previously sent data chunk based on the source reference and writes the previously sent data chunk at the target reference associated with the one or more storage volumes 103 (e.g., a storage location for the object being restored). For example, storage system 112 may determine that data chunks associated with an object offset of 50 MB-60 MB associated with a second object have been previously sent to content destination 102. The source and target references may indicate that for the object offset of 50 MB-60 MB associated with the second object, the data chunks may be located at a source storage location associated with an object offset of 10 MB-20 MB associated with a first object. In some embodiments, restore agent 104 reads the data at the object offset associated with the first object and writes the read data at a storage location for the second object. Restore agent 104 obtains locks for the first object and the second object to ensure data integrity for the objects when performing the write operation. Locking the first object may prevent previously stored data chunks associated with the first object from being modified while they are being written to a storage location associated with the second object. In some embodiments, all of the objects being restored to content destination 102 are locked until the restore operation is completed.

In some embodiments, the data chunks associated with the source reference are stored in a cache associated with restore agent 104. Instead of reading the data at the object offset associated with the first object, restore agent 104 may obtain the data from the cache and write the data chunks associated with the source reference at the target reference storage location for the second object. Data chunks may be removed from the cache associated with restore agent 104 based on age, popularity, etc.

In some embodiments, restore agent 104 performs deduplication and writes at the target reference storage location for the second object a reference to the object offset associated with the first object.

In the event a computed chunk identifier does not match a chunk identifier stored in data chunk data structure 117, storage system 112 is configured to provide to content destination 102 the data chunk associated with the non-matching chunk identifier. In response to receiving the data chunk associated with the non-matching chunk identifier, restore agent 104 is configured to store the data chunk associated with the non-matching chunk identifier in the one or more storage volumes 103.

The storage system is configured to perform this process for one or more subsequent batches of data chunks until the one or more requested objects are restored. As a result, the impact of network latency on the restore operation has been reduced because the amount of data that has been provided from storage system 112 to content destination 102 has been reduced.

In some embodiments, the requested object(s) are divided into segments and corresponding segment(s) are assigned to some or all of the nodes 111, 113, 115. In some embodiments, a segment includes one or more of the requested objects. In some embodiments, a segment includes part of an object (e.g., a large object). A segment may be divided into one or more batches of data chunks. Some or all of nodes 111, 113, 115 may perform the restore operation in parallel. In some embodiments, each of the nodes 111, 113, 115 is configured to update data chunk data structure 117 after a batch of data chunks is provided to content destination 102. After receiving the batch of data chunks, restore agent 104 provides an acknowledgement to a sending node. In response to receiving the acknowledgement, the sending node updates data chunk data structure 117. In the event a plurality of nodes send the same data chunk to content destination 102, the sending node that first receives the acknowledgement updates data chunk data structure 117. In some embodiments, each of the nodes 111, 113, 115 is configured to update data chunk data structure 117 prior to a batch of data chunks being provided to content destination 102. This may prevent other nodes from accidentally sending a duplicate of a data chunk that was previously sent by a different node.

Figure 2:
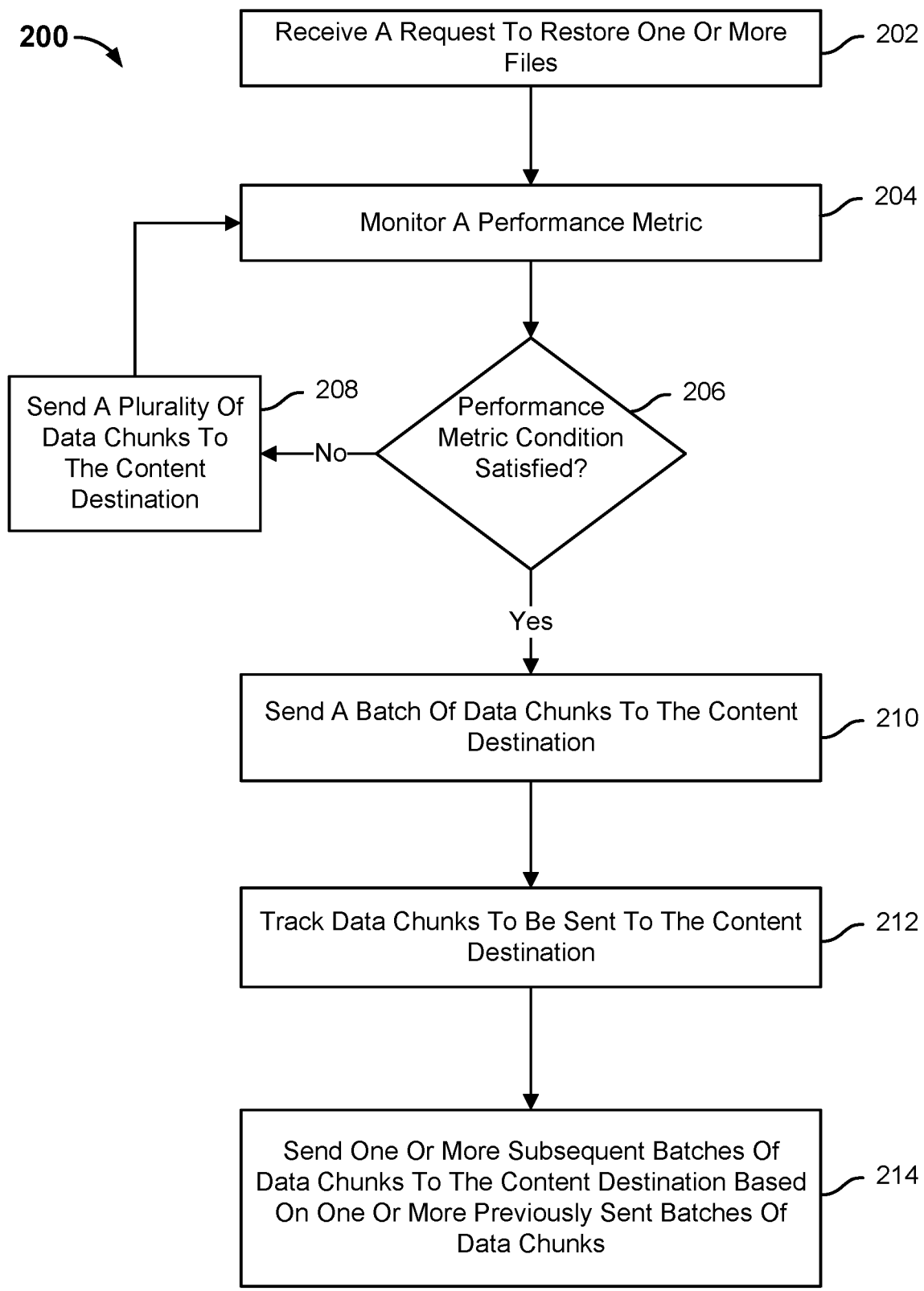
FIG. 2 is a flow diagram illustrating an embodiment of a process for reducing the impact of network latency during a restore operation.

FIG. 2 is a flow diagram illustrating an embodiment of a process for reducing the impact of network latency during a restore operation. In the example shown, process 200 may be implemented by a storage system, such as storage system 112.

At 202, a request to restore one or more objects is received. In some embodiments, the request is for a large number of objects (e.g., greater than a threshold number). In some embodiments, the request is for a large object (e.g., greater than a threshold object size).

At 204, a performance metric is monitored. The performance metric may be a latency associated with a network connection between the storage system and the content destination, load throughput, available network bandwidth, network environment (e.g., high latency and high bandwidth or low latency and low bandwidth, CPU utilization at the content destination, Input/Output Operations Per Second (IOPS) at the content destination, resource availability (e.g., memory availability) at the content destination, read/write costs associated with the content destination, or a combination thereof.

At 206, it is determined whether a performance metric condition is satisfied. A performance metric condition may be satisfied when the performance metric falls above, is at, or below a corresponding performance metric threshold. For example, the performance metric condition may be satisfied when a round trip time from the storage system to the content destination and back is greater than a round trip time threshold.

In the event it is determined that the performance metric condition is satisfied, process 200 proceeds to step 210. In the event it is determined that the performance metric condition is not satisfied, process 200 proceeds to 208.

At 208, a batch of data chunks associated with the one or more requested objects is sent to the content destination. In some embodiments, the requested object(s) are divided into segments. In some embodiments, a segment includes one or more of the requested objects. In some embodiments, a segment includes part of an object (e.g., a large object). A segment may be divided into one or more batches of data chunks.

In some embodiments, the segments are assigned to one of the nodes of the storage system and the assigned node restores the batches of data chunks to the content destination. In some embodiments, corresponding segments are assigned to some or all of the nodes of the storage system. Some or all of the nodes of the storage system may restore batches of data chunks to the content destination in parallel.

In some embodiments, steps 204, 206, and 208 are optional.

At 210, a batch of data chunks is sent to the content destination. A node of the storage system is assigned one of the segments of the requested object(s). The node sends the batch of data chunks associated with the assigned segment to the content destination.

At 212, data chunks sent to the content destination are tracked. A node computes corresponding chunk identifiers for data chunks included in a batch. The node updates a data structure that indicates the data chunks that have been restored to the content destination to include the computed chunk identifiers for data chunks included in the batch.

In some embodiments, a plurality of nodes are sending batches of data chunks to the content destination. In some embodiments, each of the nodes is configured to update the data chunk data structure after a batch of data chunks is provided to the content destination. After receiving the batch of data chunks, a restore agent provides an acknowledgement to a sending node. In response to receiving the acknowledgement, the sending node updates the data structure. In the event a plurality of nodes send the same data chunk to the content destination, the sending node that first receives the acknowledgement is the node that updates the data structure. In some embodiments, each of the nodes is configured to update the data structure prior to a batch of data chunks being provided to the content destination. This may prevent other nodes from accidentally sending a duplicate of a data chunk that was previously sent by a different node.

At 214, one or more subsequent batches of data chunks are sent to the content destination based on one or more previously sent batches of data chunks. A subsequent batch of data chunks may refer to a subsequent portion of the object, a portion of a different object, or different objects. Prior to sending a subsequent batch of data chunks, the storage system determines whether any of the data chunks included in the subsequent batch were previously sent to the content destination by computing corresponding chunk identifiers for data chunks included in the subsequent batch and comparing the computed chunk identifiers with the chunk identifiers stored in the data structure. For a subsequent batch of data chunks, the storage system includes in the subsequent batch data chunks having chunk identifiers that do not match chunk identifiers stored in the data structure. The storage system may provide with or provide separately, reference(s) to any previously sent data chunks to the content destination.

One of more subsequent batches of data chunks are sent until the one or more requested objects are restored.

Figure 3:
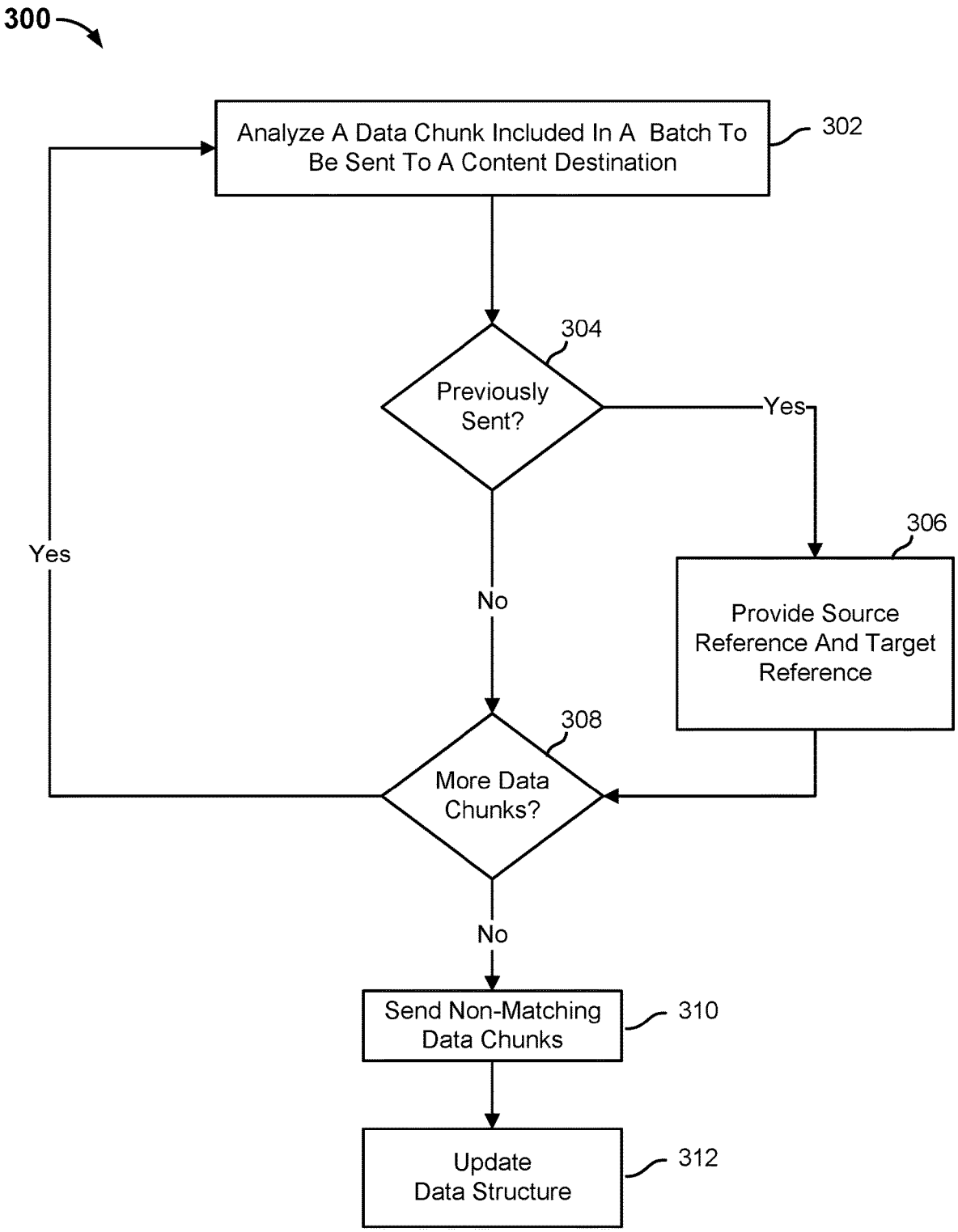
FIG. 3 is a flow diagram illustrating an embodiment of a process for analyzing a batch of data chunks.

FIG. 3 is a flow diagram illustrating an embodiment of a process for analyzing a batch of data chunks. In the example shown, process 300 may be implemented by a storage system, such as storage system 112. In some embodiments, process 300 is implemented to perform some or all of step 214 of process 200.

At 302, a data chunk included in a batch of data chunks to be sent to a content destination is analyzed. A chunk identifier is computed for the data chunk.

At 304, it is determined whether the data chunk was previously sent to the content destination. The chunk identifier for the data chunk is compared to chunk identifiers stored in a data structure. Chunk identifiers included in the data structure correspond to data chunks that were previously sent to the content destination. In the event the chunk identifier for the data chunk matches one of the chunk identifiers stored in the data structure, process 300 proceeds to 306. In the event the chunk identifier for the data chunk does not match one of the chunk identifiers stored in the data structure, process 300 proceeds to 308.

At 306, a source reference that indicates an object to which the previously sent data chunk was written and a target reference that indicates an object to which the previously sent data chunk is to be written are provided. The source reference may include one or more of an object name, an object offset, a read size, a source storage location, a chunk identifier, or an object path (e.g., file path). The object to which the previously sent data chunk is to be written may be the same object associated with the previously sent data chunk (i.e., the object that is currently being restored) or a different object that was previously restored.

In some embodiments, the source and target reference(s) are provided with the batch of data chunks. In some embodiments, the source and target reference(s) are provided separately from the batch of data chunks.

At 308, it is determined whether there are more data chunks included in the batch of data chunks. In the event there are more data chunks included in the batch, process 300 returns to step 302. In the event there are no more data chunks included in the batch, process 300 proceeds to step 310 where the batch of non-matching data chunks is sent to the content destination. At 312, the data structure is updated to include the chunk identifiers corresponding to data chunks included in the batch.

Figure 4:
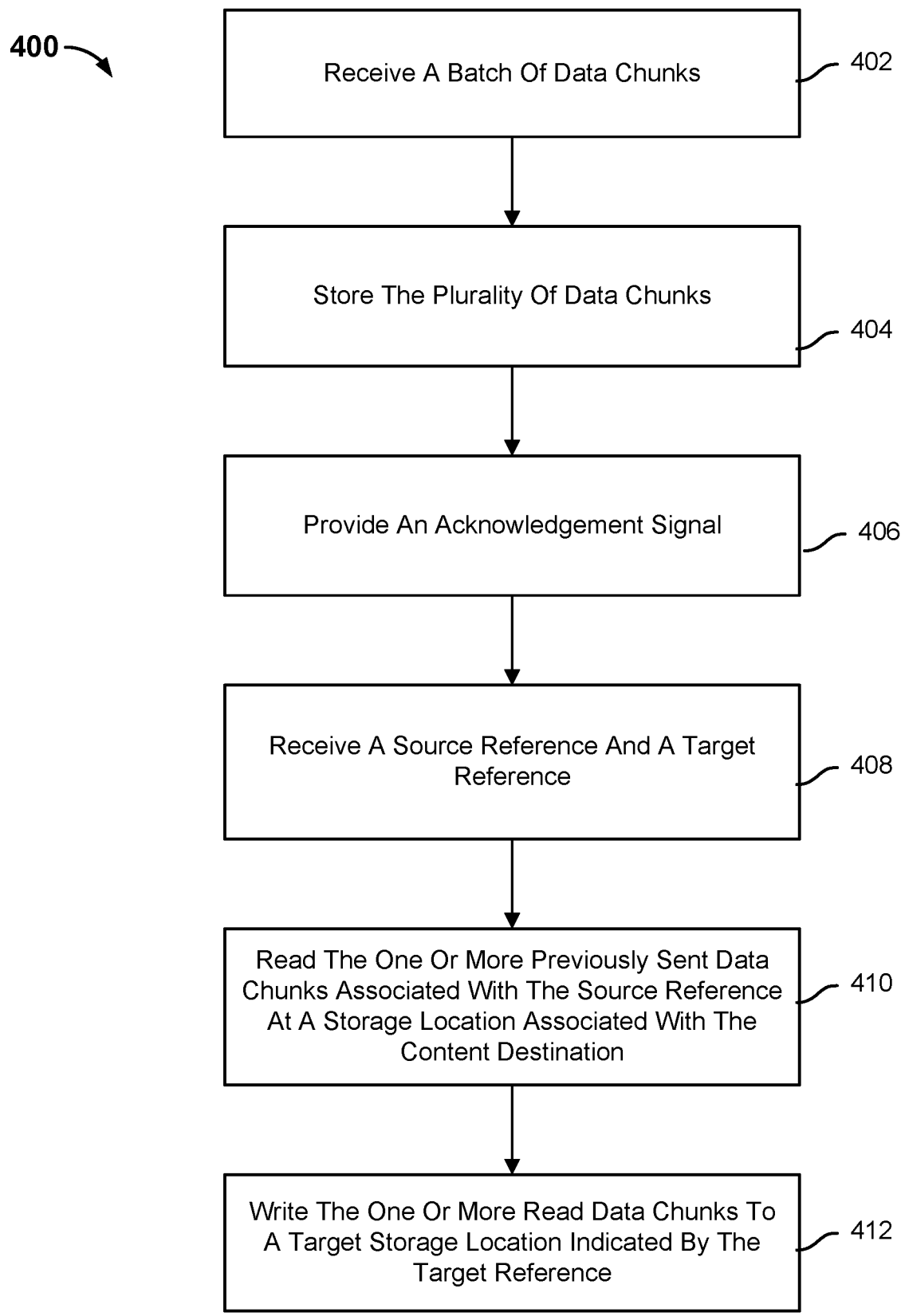
FIG. 4 is a flow diagram illustrating an embodiment of a process for restoring an object.

FIG. 4 is a flow diagram illustrating an embodiment of a process for restoring an object. In the example shown, process 400 may be implemented by a restore agent, such as restore agent 104.

At 402, a batch of data chunks is received. In some embodiments, the batch of data chunks includes data chunks for one or more objects. In some embodiments, the batch of data chunks includes data chunks for a portion of an object.

At 404, the batch of data chunks are stored. The batch of data chunks are stored in a storage volume at a content destination. In some embodiments, the batch of data chunks are temporarily stored in a cache of a restore agent.

At 406, an acknowledgment signal is provided. The acknowledgement signal indicates that the batch of data chunks was received.

At 408, a source reference that indicates an object to which the previously sent data chunk was written and a target reference that indicates an object to which the previously sent data chunk is to be written are received. The source reference may include one or more of an object name, an object offset, a read size, a source storage location, a chunk identifier, or an object path (e.g., file path.). For example, the source and target references may indicate that for an object offset of 50 MB-60 MB associated with a second object, the data chunks may be located at a storage location corresponding to an object offset of 10 MB-20 MB associated with a first object. The object to which the previously sent data chunk is to be written may be the same object associated with the previously sent data chunk (i.e., the object that is currently being restored) or a different object that was previously restored.

The restore agent uses the source reference to determine a source storage location associated with the previously sent data chunk. In some embodiments, the previously sent data chunk is determined to be stored in a storage volume at the content destination. In some embodiments, the previously sent data chunk is determined to also be stored in a cache of the restore agent. For example, the restore agent may determine that a data chunk having a chunk identifier that matches the previously sent data chunk is stored in the cache.

At 410, one or more previously sent data chunks associated with the source reference are read at a storage location associated with the content destination. The one or more previously sent data chunks are read from the determined source storage location associated with the previously sent data chunks at the content destination. In some embodiments, the determined storage location is located in the storage volume at the content destination. In some embodiments, the determined storage location is a cache of the restore agent at the content destination.

At 412, the one or more read data chunks are written to a target storage location indicated by the target reference. For example, the data stored in a location for the object offset of 10-20 MB associated with the first object is written to a location associated with an object offset of 50 MB-60 MB of the second object.

In some embodiments, steps 402, 404, and 406 are optional. For example, the data chunks included in a batch have all been previously stored at a content destination. In some embodiments, steps 408, 410, and 412 are optional. For example, none of the data chunks included in a batch have been previously stored at a content destination.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving at a storage system from a content destination a request to restore one or more objects;
   dividing the one or more objects into a plurality of segments;
   assigning at least a first segment to a first node of the storage system and a second segment to a second node of the storage system, wherein the first segment is divided into one or more batches of data chunks that at least includes a first batch of data chunks and the second segment is divided into one or more batches of data chunks that at least includes a second batch of data chunks;
   providing in parallel, from the first node and the second node of the storage system to the content destination the first batch of data chunks associated with the one or more objects and the second batch of data chunks associated with the one or more objects;
   tracking by a sending node of the storage system that at least includes the first node and the second node a plurality of data chunks associated with the one or more objects provided to the content destination, wherein the sending node tracks the plurality of data chunks associated with the one or more objects provided to the content destination by:
      computing a corresponding chunk identifier for each data chunk of the plurality of data chunks included a corresponding batch of data chunks associated with the one or more objects,
      receiving an acknowledgement signal from the content destination after providing the corresponding batch of data chunks associated with the one or more objects, and
      in response to receiving the acknowledgement signal, updating a data structure stored by the storage system to include a corresponding entry that includes the corresponding chunk identifier for each data chunk of the plurality of data chunks included in the corresponding batch of data chunks associated with the one or more objects;
   determining whether a first data chunk included in a current batch of data chunks associated with an object that are to be sent to the content destination matches one of the plurality of data chunks previously sent to the content destination by determining whether a chunk identifier associated with the first data chunk included in the current batch of data chunks matches any of the chunk identifiers stored by the data structure; and in response to the determination that the first data chunk included in the current batch of data chunks to be sent to the content destination matches one of the plurality of data chunks previously sent to the content destination, providing to the content destination a source reference to the matching previously sent data chunk where the content destination is capable of locally obtaining content for the first data chunk in a storage volume at the content destination, wherein the source reference includes an object name of a content destination object storing the first data chunk and an object offset within the content destination object storing the first data chunk.

2. The method of claim 1, wherein determining whether the first data chunk included in the current batch of the data chunks associated with the object that is to be sent to the content destination matches one of the plurality of data chunks previously sent to the content destination includes:
   computing a corresponding chunk identifier for the first data chunk; and
   comparing the corresponding chunk identifier for the first data chunk to chunk identifiers stored in the data structure.

3. The method of claim 1, wherein the source reference further includes one or more of a read size, a source storage location, a chunk identifier, or an object path.

4. The method of claim 1, further comprising monitoring a performance metric.

5. The method of claim 4, further comprising determining that a performance metric condition is satisfied.

6. The method of claim 4, wherein the performance metric is a network latency between the storage system and the content destination.

7. The method of claim 1, wherein the content destination locally obtains the first data chunk from a storage location associated with a different object.

8. The method of claim 1, wherein the content destination locally obtains the content for a portion of the object from a storage location associated with a same object.

9. The method of claim 1, wherein the content destination locally obtains the content for a different portion of the object from a cache of a restore agent associated with the content destination.

10. The method of claim 1, further comprising:
   determining whether a subsequent batch of data chunks of the object to be sent to the content destination matches one of the plurality of data chunks previously sent to the content destination; and
   in response to the determination that the subsequent batch of data chunks of the object to be sent to the content destination does match one of the plurality of data chunks previously sent to the content destination, providing to the content destination the subsequent batch of data chunks.

11. The method of claim 10, wherein determining whether the subsequent batch of data chunks of the object to be sent to the content destination matches one of the plurality of data chunks previously sent to the content destination includes:
   computing chunk identifiers for the subsequent batch of data chunks of the object; and
   comparing the computed chunk identifiers to chunk identifiers stored in the data structure.

12. The method of claim 11, further comprising updating the data structure that stores chunk identifiers corresponding to data chunks previously sent to the content destination with the computed chunk identifiers for the subsequent batch of data chunks of the object.

13. The method of claim 1, wherein a plurality of nodes of the storage system track the plurality of data chunks associated with the one or more objects provided to the content destination.

14. The method of claim 1, wherein a plurality of nodes of the storage system are assigned corresponding portions of the object and restore the corresponding portions of the object to the content destination.

15. The method of claim 1, wherein a plurality of nodes of the storage system are assigned corresponding portions of the object and restore, in parallel, the corresponding portions of the object to the content destination.

16. A computer program product embodied in a non-transitory computer readable medium and comprising computer instructions for:
   receiving at a storage system from a content destination a request to restore one or more objects;
   dividing the one or more objects into a plurality of segments;
   assigning at least a first segment to a first node of the storage system and a second segment to a second node of the storage system, wherein the first segment is divided into one or more batches of data chunks that at least includes a first batch of data chunks and the second segment is divided into one or more batches of data chunks that at least includes a second batch of data chunks;
   providing in parallel, from the first node and the second node of the storage system to the content destination the first batch of data chunks associated with the one or more objects and the second batch of data chunks associated with the one or more objects;
   tracking by a sending node of the storage system that at least includes the first node and the second node a plurality of data chunks associated with the one or more objects provided to the content destination, wherein the sending node tracks the plurality of data chunks associated with the one or more objects provided to the content destination by:
      computing a corresponding chunk identifier for each data chunk of the plurality of data chunks included a corresponding batch of data chunks associated with the one or more objects,
      receiving an acknowledgement signal from the content destination after providing the corresponding batch of data chunks associated with the one or more objects, and
      in response to receiving the acknowledgement signal, updating a data structure stored by the storage system to include a corresponding entry that includes the corresponding chunk identifier for each data chunk of the plurality of data chunks included in the corresponding batch of data chunks associated with the one or more objects;
   determining whether a first data chunk included in a current batch of data chunks associated with an object that is to be sent to the content destination matches one of the plurality of data chunks previously sent to the content destination by determining whether a chunk identifier associated with the first data chunk included in the current batch of data chunks matches any of the chunk identifiers stored by the data structure; and
   in response to the determination that the first data chunk included in the current batch of data chunks associated with the object that is to be sent to the content destination matches one of the plurality of data chunks previously sent to the content destination, providing to the content destination a source reference to the matching previously sent data chunk where the content destination is capable of locally obtaining content for the first data chunk in a storage volume at the content destination, wherein the source reference includes an object name of a content destination object storing the first data chunk and an object offset within the content destination object storing the first data chunk.

17. A storage system, comprising:

a processor of a first node configured to:
  receive from a content destination a request to restore one or more objects;
  divide the one or more objects into a plurality of segments;
  assign at least a first segment to the first node and a second segment to a second node of the storage system, wherein the first segment is divided into one or more batches of data chunks that at least includes a first batch of data chunks and the second segment is divided into one or more batches of data chunks that at least includes a second batch of data chunks; and
  provide in parallel, the first batch of data chunks associated with the one or more objects as a second node of the storage system provides to the content destination the second batch of data chunks associated with the one or more objects,
  wherein the first node and the second node track a plurality of data chunks associated with the one or more objects provided to the content destination, wherein to track the plurality of data chunks associated with the one or more objects provided to the content destination, the first node and the second node are configured to:
    compute a corresponding chunk identifier for each data chunk of the plurality of data chunks included a corresponding batch of data chunks associated with the one or more objects,
    receive an acknowledgement signal from the content destination after providing the corresponding batch of data chunks associated with the one or more objects, and
    in response to receiving the acknowledgement signal, a data structure stored by the storage system to include a corresponding entry that includes the corresponding chunk identifier for each data chunk of the plurality of data chunks included in the corresponding batch of data chunks associated with one or more objects;
  wherein the first node is configured to determine whether a first data chunk included in a current batch of data chunks associated with an object that is to be sent to the content destination matches one of the plurality of data chunks previously sent to the content destination by determining whether a chunk identifier associated with the first data chunk included in the current batch of data chunks matches any of the chunk identifiers stored by the data structure, and
  wherein in response to the determination that the first data chunk included in the current batch of data chunks associated with the object that is to be sent to the content destination matches one of the plurality of data chunks previously sent to the content destination, the first node is configured to provide to the content destination a source reference to the matching previously sent data chunk where the content destination is capable of locally obtaining content for the first data chunk in a storage volume at the content destination, wherein the source reference includes an object name of a content destination object storing the first data chunk and an object offset within the content destination object storing the first data chunk; and
  a memory coupled to the processor and configured to provide the processor with instructions.

* * * * *